J. F. McMANN.
SIPHON.
APPLICATION FILED APR. 11, 1911.
1,224,477.
Patented May 1, 1917.
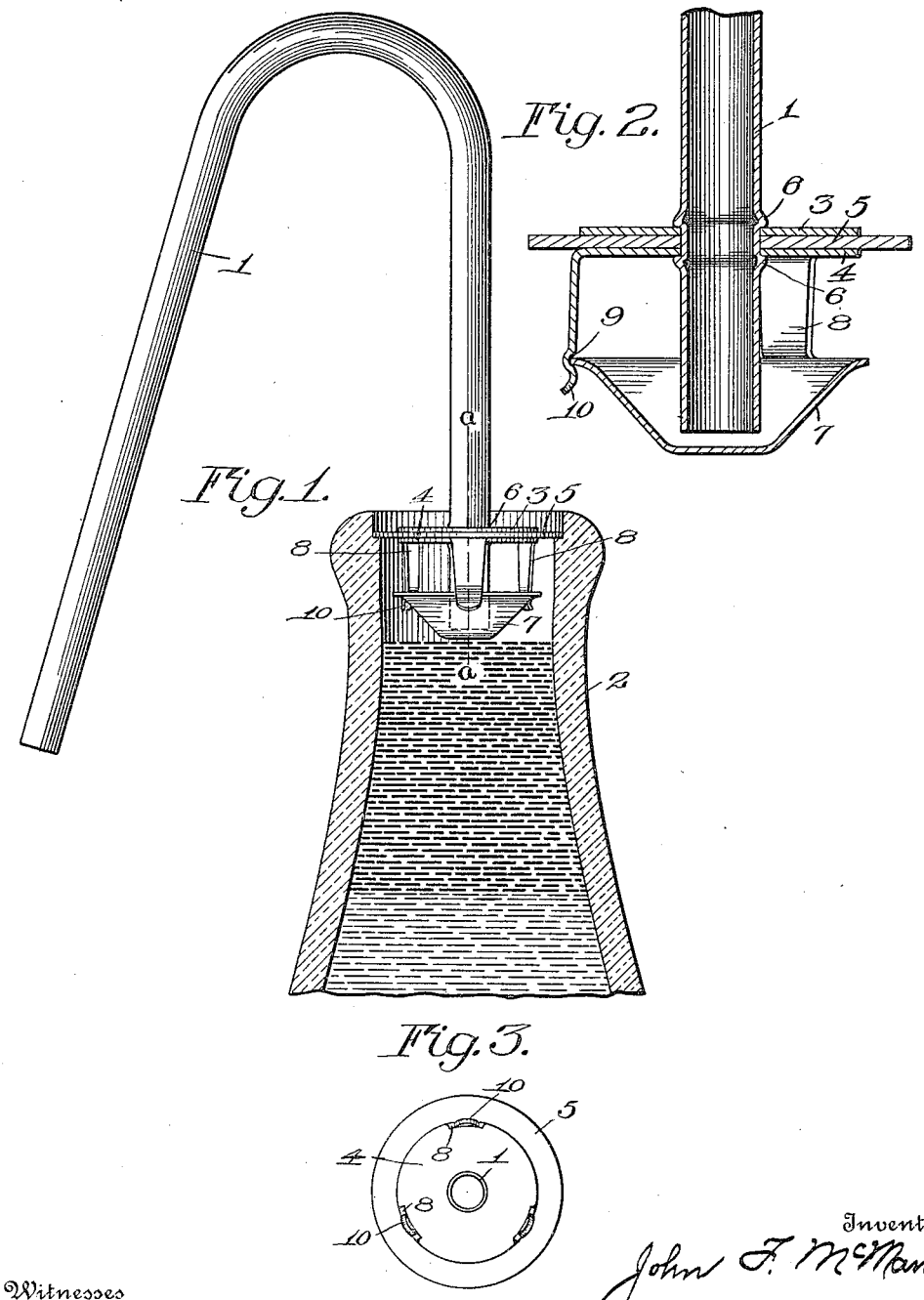

UNITED STATES PATENT OFFICE.

JOHN F. McMANN, OF ROCHESTER, NEW YORK.

SIPHON.

1,224,477.  Specification of Letters Patent.  Patented May 1, 1917.

Application filed April 11, 1911. Serial No. 620,288.

*To all whom it may concern:*

Be it known that I, JOHN F. McMANN, of Rochester, in the county of Monroe and State of New York, have invented a new and useful Improvement in Siphons, which improvement is fully set forth in the following specification and shown in the accompanying drawings.

The present invention relates to siphons and it has for an object to provide a construction adapted to coöperate with the ordinary commercial milk bottle to start a siphonic action, in order that the siphon may be utilized for separating the cream at the top of the bottle from the milk at the lower portion.

To these and other ends the invention consists in certain parts and combinations of parts all of which will be hereinafter described, the novel features being pointed out in the appended claims.

In the drawings:

Figure 1 is a side view of the improved siphon as it is being introduced into the neck of an ordinary or commercial milk bottle;

Fig. 2 is a section on the line *a—a* Fig. 1; and

Fig. 3 is a bottom view of the siphon showing the fender, that prevents the direct upward movement of the liquid, removed.

In carrying out the invention, there is employed a siphon 1 preferably made from sheet metal such as aluminum and having a piston on its intake leg so formed that it may be introduced into the neck or the mouth of a receptacle such as a commercial milk bottle 2. The piston preferably is arranged in spaced relation to the intake end of the siphon and may comprise two aluminum or unyielding disks 3 and 4 spaced from each other by a disk 5 of yielding material such as rubber, the disk 5 preferably projecting beyond the peripheries of the disks 3 and 4 so as to provide a yielding free edge which forms an air tight joint with the internal wall of the receptacle. The piston may be held against movement on the siphon in any suitable manner. In this instance, annular beads 6 are extended outwardly from the metal of the siphon to engage the outer faces of the disks 3 and 4, thus also holding together the disks 3, 4 and 5 forming the piston.

To the end of preventing a direct upward movement of the liquid into the intake of the siphon so as to confine the action of the siphon to the cream alone, there may be provided a cup shaped fender 7 receiving the intake end of the siphon 1 and held in spaced relation thereto from the piston. With this purpose in view, the lower disk 4 of the piston has spring arms 8 depending therefrom and preferably formed in one piece therewith. The free ends of the arms are grooved at 9 to receive the periphery of the fender 7 and finger pieces 10 are provided on the arms 8 below the grooves 9 for the purpose of facilitating the connection and the release of the fender.

In the operation of the invention, the siphon is used as a handle to force the piston within the neck of the receptacle 2, the resilient periphery of the piston coöperating with the walls of the receptacle to form a tight joint so that sufficient pressure is secured on the top of the liquid to force the cream past the bend of the siphon, thus starting the siphonic action which will continue as long as the intake end of the siphon is below the liquid level. If only pure cream is desired, care should be taken that the intake end of the siphon does not pass below the cream, and the fender 7 will act to prevent a direct upward movement of the liquid so that no liquid below the end of the siphon can be drawn. A siphon constructed in accordance with this invention is simple in its operation, inexpensive to manufacture, and not liable to get out of order. Furthermore it is sanitary, in every respect, as there are no places in which dirt or other matter may collect, and the fender is removable to permit the cleaning thereof and of the siphon tube.

What I claim as my invention and desire to secure by Letters Patent, is—

1. A siphon comprising an imperforate flexible disk attached to the intake leg, and adapted to coact with the interior of the neck of a receptacle, of which the neck is of less diameter than the body, to commence a flow of the contents of the receptacle through the siphon, and to pass into the body of the receptacle and expose the contents to atmospheric pressure to allow the flow to continue.

2. A siphon having a piston on its intake leg, and a fender supported by the piston to prevent the direct upward movement of liquid into the intake of the siphon.

3. A siphon having a piston on its intake leg, spring arms depending from the piston, and a fender detachably engaged by the arms to prevent direct upward movement of the liquid into the intake.

4. A siphon having a disk surrounding its intake leg, spring arms depending from the disk, and a fender carried by said arms to prevent direct upward movement of the liquids into the intake.

JOHN F. McMANN.

Witnesses:
A. M. WHITMORE,
E. T. WOODEN.

Copies of this patent may be obtained for five cents each, by addressing the "Commissioner of Patents, Washington, D. C."